US012738495B2

(12) United States Patent
Cao et al.

(10) Patent No.: US 12,738,495 B2
(45) Date of Patent: Sep. 15, 2026

(54) CATHODE MATERIAL AND PREPARATION METHOD THEREFOR, CATHODE SHEET AND SODIUM-ION BATTERY

(71) Applicant: HUBEI WANRUN NEW ENERGY TECHNOLOGY CO., LTD., Shiyan (CN)

(72) Inventors: Minglei Cao, Shiyan (CN); Haobo Zhan, Shiyan (CN); Fei Lv, Shiyan (CN); Qin Wang, Shiyan (CN); Tangping Peng, Shiyan (CN)

(73) Assignee: HUBEI WANRUN NEW ENERGY TECHNOLOGY CO., LTD., Shiyan (CN)

( * ) Notice: Subject to any disclaimer, the term of this patent is extended or adjusted under 35 U.S.C. 154(b) by 0 days.

(21) Appl. No.: 19/102,670

(22) PCT Filed: Jan. 8, 2025

(86) PCT No.: PCT/CN2025/071356
§ 371 (c)(1),
(2) Date: Feb. 10, 2025

(87) PCT Pub. No.: WO2026/143759
PCT Pub. Date: Jul. 9, 2026

(65) Prior Publication Data
US 2026/0196500 A1 Jul. 9, 2026

(30) Foreign Application Priority Data
Jan. 6, 2025 (CN) ......................... 202510019534.7

(51) Int. Cl.
*H01M 4/58* (2010.01)
*C01B 25/45* (2006.01)
*H01M 10/054* (2010.01)

(52) U.S. Cl.
CPC .......... *H01M 4/5825* (2013.01); *C01B 25/45* (2013.01); *H01M 10/054* (2013.01);
(Continued)

(58) Field of Classification Search
CPC ..................................................... C01B 25/45
See application file for complete search history.

(56) References Cited

U.S. PATENT DOCUMENTS

2013/0078521 A1 3/2013 Kim et al.

FOREIGN PATENT DOCUMENTS

CN 106328911 A 1/2017
CN 114824216 A 7/2022
(Continued)

OTHER PUBLICATIONS

The granted search report of counterpart CN application No. 202510019534.7 was issued on Sep. 17, 2025.
(Continued)

*Primary Examiner* — Peter F Godenschwager
(74) *Attorney, Agent, or Firm* — Scully, Scott, Murphy & Presser, P.C.

(57) ABSTRACT

Provided are a cathode material and a preparation method therefor, a cathode sheet and a sodium-ion battery. The cathode material includes a composite particle, a molecular formula of the composite particle is $Na_4M_xMn_{1-x/2}V(PO_4)_{3-x/3}N_x$, wherein 0.001≤x≤0.05, M is Li and/or K, and N is selected from one or more of F, Cl, Br, and I. According to the present disclosure, by synchronously introducing specific types and contents of anions and cations into a polyanionic phosphate active cathode material to achieve a good synergistic effect between the anions and cations, the particle morphology and size of the material are regulated while the intrinsic conductivity and structural stability of the cathode material are greatly improved, and significant
(Continued)

improvement of the comprehensive performance, such as specific capacity, rate capability, cycle stability and compaction density, of the material is promoted.

20 Claims, 1 Drawing Sheet

(52) U.S. Cl.
CPC ...... *C01P 2002/52* (2013.01); *C01P 2002/72* (2013.01); *C01P 2004/03* (2013.01); *C01P 2004/80* (2013.01); *C01P 2006/40* (2013.01)

(56) References Cited

FOREIGN PATENT DOCUMENTS

| | | | |
|---|---|---|---|
| CN | 115377413 | A | 11/2022 |
| CN | 116130621 | A | 5/2023 |
| CN | 117613244 | A | 2/2024 |
| CN | 117810431 | A | 4/2024 |
| CN | 119160867 | A | 12/2024 |
| CN | 119833629 | A | 4/2025 |
| JP | 2013077425 | A | 4/2013 |
| WO | 2018025795 | A | 2/2018 |

OTHER PUBLICATIONS

Gao, X. et al:“phase transformation, charge transfer, and ionic diffusion of NA4MNV(PO4)3 in sodium-ion batteries:a combined first-principles and experimental study”;J.Mater.Chem.A;Jul. 27, 2020;DOI: 10.1039/d0ta05929c; pp. 17477-17486.

The office action of counterpart KR application No. 10-2025-7007063 was issued on Dec. 18, 2025.

Zhang et al., Boosting rate and cycling performance of K-doped Na3V2(PO4)2F3 cathode for high-energy-density sodium-ion batteries, Green Energy & Environment Jul. 2022, pp. 1253-1262, Feb. 1, 2021.

Soundharrajan, et al., The advent of manganese-substituted sodium vanadium phosphate-based cathodes for sodiumion batteries and their current progress: a focused review, J. Mater. Chem A. Oct. 2022, pp. 1022-1046, Jan. 21, 2022.

International Search Report dated Jul. 3, 2025 received in International Application No. PCT/CN2025/071356.

The search report of counterpart EP application No. 25704750.6 was issued on May 19, 2026.

Zhan, H. et al., “Potassium regulated Na4MnV(PO4)3 microspheres cathode towards robust sodium ion batteries”, Vacuum. Pergamon Press, GB, Dec. 2024, pp. 1-9, vol. 233.

CATHODE MATERIAL AND PREPARATION METHOD THEREFOR, CATHODE SHEET AND SODIUM-ION BATTERY

CROSS-REFERENCE TO RELATED APPLICATIONS

This application is a National Stage Entry under 35 U.S.C. § 371 of PCT International Application No PCT/CN2025/071356 filed on Jan. 8, 2025, which claims priority to Chinese Patent Application No. 202510019534.7 filed to the China National Intellectual Property Administration on Jan. 6, 2025 and entitled "CATHODE MATERIAL AND PREPARATION METHOD THEREFOR, CATHODE SHEET AND SODIUM-ION BATTERY", the entire disclosures of each of which are hereby incorporated by reference.

TECHNICAL FIELD

The present disclosure relates to the technical field of sodium-ion batteries, and specifically relates to a cathode material and a preparation method therefor, a cathode sheet and a sodium-ion battery.

BACKGROUND

Sodium-ion batteries are expected to become good substitutes for lithium-ion batteries because of abundant sodium resources, low prices and similar electrochemical behaviors to lithium. Due to cost effectiveness, environmental friendliness, safety, temperature adaptability, a fast charging capability and a relatively long cycle life, the sodium-ion batteries have been considered as a promising alternative solution in battery technologies of new energy vehicles. With advances in technology, the sodium-ion batteries are expected to become one of the mainstream battery technologies of the new energy vehicles in the next few years to provide more lasting and safer power for electric vehicles. Cathodes are used as important parts of the sodium-ion batteries, and the performance of which has an important impact on various indicators of the entire batteries. Common sodium-ion cathode materials, such as layered transition metal oxides, Prussian blue compounds and polyanionic compounds, etc., all have the disadvantages of low specific energy and poor cycle stability, which will hinder commercial development and practical application. Therefore, it is urgent to develop cathode materials with excellent electrochemical performance for the sodium-ion batteries to meet actual demands.

Among the polyanionic compounds, NASICON phosphates have become key development targets of the cathode materials for the sodium-ion batteries because of the advantages of a stable structure, high ionic conductivity, a high voltage platform, etc. Among them, a sodium vanadium manganese phosphate [$Na_4VMn(PO_4)_3$] material has been widely concerned because of a relatively high specific capacity (117 $mAh \cdot g^{-1}$). However, the $Na_4VMn(PO_4)_3$ material has poor electronic conductivity and irreversible phase transition in a charge-discharge process, resulting in rapid decrease of the capacity, thus leading to unsatisfactory cycle stability and rate capability. To improve the electrochemical performance of $Na_4VMn(PO_4)_3$, the technical means of ion doping has been mainly used by researchers to overcome inherent defects of the material. In recent years, some studies show that cation doping can effectively inhibit the lattice distortion of the $Na_4VMn(PO_4)_3$ material caused by a Jahn-Teller effect of $Mn^{3+}$ and can increase the vacancy concentration of $Na^+$, thereby enhancing the ion diffusion ability. In addition, anion doping can also arouse lattice defects of the $Na_4VMn(PO_4)_3$ material, thereby widening the transport channel of sodium ions and improving the stability of the material.

In summary, separate use of the cation doping or the anion doping can overcome the inherent defects of the $Na_4VMn(PO_4)_3$ material to a certain extent, which is conducive to improving the intrinsic conductivity. However, whether the cation doping or the anion doping of a NASICON phosphate crystal is separately performed, the instability of a lattice structure of the material will be caused, thereby affecting the mechanical properties and thermal stability of the material. Moreover, up to now, relevant studies on simultaneous cation and anion doping of the $Na_4VMn(PO_4)_3$ material are still in shortage, and especially whether co-doping of anions and cations can be achieved is still unclear.

Therefore, how to achieve co-doping of anions and cations in the polyanionic phosphate active cathode materials of the sodium-ion batteries to achieve more superior electrochemical performance is one of important technical problems to be solved urgently in the art.

SUMMARY

The main objective of the present disclosure is to provide a cathode material and a preparation method therefor, a cathode sheet and a sodium-ion battery, aiming to solve the problem of poor electrochemical performance of polyanionic phosphate active cathode materials in the prior art.

To achieve the above objective, a first aspect of the present disclosure provides a cathode material. The cathode material includes a composite particle, a molecular formula of the composite particle is $Na_4M_xMn_{1-x/2}V(PO_4)_{3-x/3}N_x$, wherein $0.001 \le x \le 0.05$, M is Li and/or K, and N is selected from one or more of F, Cl, Br, and I.

In the present disclosure, the cathode material with particularly excellent electrochemical performance is obtained by co-doping of anions and cations. Wherein, the introduction of anions and cations can regulate an electronic structure of the cathode material and effectively increase active sites of the cathode material, thereby increasing the specific capacity of the cathode material. Specifically, compared with other types of anions and cations in the art, the halogen anions, such as F, Cl, Br, and I, and the alkali metal cations, such as Li and/or K, provided in the present disclosure can greatly improve the structural stability of a polyanionic phosphate material and the diffusion ability of $Na^+$ therein, such that the cathode material achieves excellent cycle stability and rate capability. Meanwhile, the micro-morphology and size of the particle of the cathode material can also be regulated through the co-doping of anions and cations, thereby greatly increasing the compaction density of the cathode material and achieving higher energy density in practical application.

Wherein, the halogen anions have higher electronegativity than common acid radical ions in the art, such as sulfate radicals, phosphate radicals, carbonate radicals, etc., and can form stronger bonding with original transition metal ions, such as Mn and V, in the cathode material, thereby significantly improving the structural stability and electrochemical performance of the cathode material. The alkali metal cations, such as Li and/or K, have a more suitable ionic radius to be more easily embedded into and disembedded out of a polyanionic phosphate structure than other common cations in the art, such as $Ca^{2+}$, $Mg^{2+}$, etc., thereby improving the charge performance and discharge performance of a battery corresponding to the cathode material. Meanwhile, the aforementioned ions also exhibit higher electrical conductivity to further optimize the electrochemical performance of the cathode material.

Based on the above types of anions and cations, doping amounts of the anions and cations are optimized, that is, a stoichiometric number in the cathode material is uniform and is $0.001 \le x \le 0.05$, such that the electronic structure can be more effectively regulated, $Na^+$ ion migration can be enhanced, and novel active sites can be formed, so as to make the cathode material exhibit higher electrochemical performance.

In particular, in addition to the selection of the types and doping amounts of the aforementioned anions and cations themselves, a coordination relationship between the two types of doping elements and a polyanionic phosphate cathode material matrix is more important. The polyanionic phosphate cathode material matrix itself has a relatively high theoretical specific capacity and good cycle stability, and the electrochemical performance can be further improved when the aforementioned anions and cations are introduced simultaneously at specific doping amounts. Compared with other types of cathode active materials, such as olivine type phosphates, the polyanionic phosphate matrix related in the present disclosure has better compatibility and coordination with the aforementioned anions and cations, and a cathode material with better electrochemical performance can be obtained ultimately. Therefore, the doping of anions and cations can enhance the structural stability, improve the electrical conductivity and promote the ion migration, thereby improving the electrochemical performance of the cathode material. Due to such synergistic effect, the polyanionic phosphate cathode material has more significant advantages in performance.

In some embodiments, in the molecular formula of the composite particle, $0.001 \le x \le 0.01$, M is Li and/or K, and N is selected from one or more of F, Br, and I.

In the present embodiment, in the molecular formula of the composite particle, $0.001 \le x \le 0.01$, thereby better avoiding the increase of the internal resistance of the cathode material and the decrease of the cycle stability caused by structural destruction of the cathode material. Meanwhile, M is preferably Li and/or K, and N is selected from one or more of F, Br, and I.

In some embodiments, the molecular formula of the composite particle is preferably $Na_4M_{0.01}Mn_{0.995}V(PO_4)_{2.997}N_{0.01}$, wherein M is Li and/or K, and N is selected from one or more of F, Br, and I; alternatively, the molecular formula of the composite particle is $Na_4M_{0.001}Mn_{0.9995}V(PO_4)_{2.9997}N_{0.001}$, wherein M is Li and/or K, and N is F. Under the above optimized molecular structure, the doping anions and cations can better synergistically cooperate with each other, such that the cathode material with more superior electrochemical performance can be obtained.

In some embodiments, considering changes in the molecular structure and electronic structure of the phosphate cathode material caused by the doping of anions and cations, the molecular formula of the composite particle is preferably $Na_4K_{0.01}Mn_{0.995}V(PO_4)_{2.997}F_{0.01}$, $Na_4Li_{0.01}Mn_{0.995}V(PO_4)_{2.997}F_{0.01}$, $Na_4K_{0.01}Mn_{0.995}V(PO_4)_{2.997}Br_{0.01}$, $Na_4K_{0.01}Mn_{0.995}V(PO_4)_{2.997}I_{0.01}$, $Na_4K_{0.001}Mn_{0.9995}V(PO_4)_{2.9997}F_{0.001}$, or $Na_4K_{0.05}Mn_{0.975}V(PO_4)_{2.983}F_{0.05}$, thereby obtaining the cathode material with better electrochemical performance and better stability.

Moreover, to further improve the stability and electrical conductivity of the cathode material, preferably, the cathode material further includes a carbon coating layer coated on outer surface of the composite particle, and calculated with a total weight of the cathode material as 100%, a mass fraction of the carbon coating layer is 1%-5%.

A second aspect of the present disclosure provides a method for preparing a cathode material.

The method for preparing a cathode material includes: preparing a sodium source, a doping element source, a manganese source, a vanadium source and a phosphorus source into a mixed slurry; and sequentially subjecting the mixed slurry to drying and calcination to obtain a cathode material; wherein the cathode material includes a composite particle, a molecular formula of the composite particle is $Na_4M_xMn_{1-x/2}V(PO_4)_{3-x/3}N_x$, $0.001 \le x \le 0.05$, M is Li and/or K, and N is selected from one or more of F, Cl, Br, and I.

For the aforementioned cathode material, the present disclosure correspondingly provides the preparation method. The preparation method is simple to operate, easy to control, and can optimize a reaction process to a greater extent to prepare the cathode material with excellent electrochemical performance at a lower manufacturing cost.

In some embodiments, the calcination sequentially includes: first-stage calcination with a temperature being 320° C.-370° C. and a temperature-holding time for the first-stage calcination being 3 h-5 h; and second-stage calcination with a temperature being 700° C.-750° C. and a temperature-holding time for the second-stage calcination being 7 h-9 h.

In the present disclosure, the calcination treatment is refined into two-stage calcination, thereby better facilitating the doping of anions and cations, better inhibiting the structural deterioration of the polyanionic phosphate cathode material itself and enhancing the structural stability and the electrochemical performance.

To better protect the structure of the cathode material and reduce the introduction and generation of impurities, preferably, the first-stage calcination and the second-stage calcination are both carried out under the protection of an inert gas, and more preferably, the inert gas is argon and/or nitrogen. Thus, the cathode material with higher electrochemical performance and better stability is obtained, and a sodium-ion battery finally prepared therefrom has a higher specific capacity and higher long-cycle stability.

Further, to remove water more rapidly and evenly to reduce material aggregation and optimize the microstructure and density of the cathode material, the drying is spray drying, and the spray drying is carried out at an air inlet temperature of 200° C.-250° C. and an air outlet temperature of 100° C.-140° C.

In some embodiments, the doping element source is selected from one or more of potassium fluoride, lithium fluoride, potassium bromide, and potassium iodide. The aforementioned doping element source can more significantly optimize the molecular structure and electronic structure of the cathode material without introducing other impurity elements, thereby facilitating the improvement of the electrochemical performance and structural stability of the cathode material more effectively.

In some embodiments, the sodium source is selected from one or more of sodium acetate, sodium carbonate, sodium hydroxide, and sodium nitrate; and/or, the phosphorus source is selected from one or more of ammonium dihydrogen phosphate, ammonium monohydrogen phosphate, ammonium phosphate, and phosphoric acid. The selection of the sodium source and the phosphorus source has an important impact on the synthesis process and final performance of the cathode material. In the present disclosure, by adjusting the types of the two as above, synthesis conditions of the cathode material can be optimized, and the consistency and stability of the material can be improved.

In some embodiments, the manganese source is selected from one or more of manganese acetate tetrahydrate, manganese nitrate, manganese phosphate, and manganese oxalate; and/or, the vanadium source is selected from one or more of ammonium metavanadate, ammonium vanadate, and ammonium sulfate. The selection of the manganese source and the vanadium source can affect the electronic structure and ion diffusion path of the cathode material. By optimizing the two respectively as above, the electronic conductivity and ion diffusion efficiency of the cathode material can be further improved.

A third aspect of the present disclosure provides a cathode sheet. The cathode sheet includes the aforementioned cathode material or a cathode material prepared by the aforementioned method for preparing a cathode material. The cathode material provided in the present disclosure has excellent electrochemical performance and stability. Therefore, when the cathode material is used as an active material of the cathode sheet, the corresponding cathode sheet also has high energy density, long cycle life and excellent electrochemical stability, thereby significantly improving the overall performance of a battery.

A fourth aspect of the present disclosure provides a sodium-ion battery, which includes the aforementioned cathode sheet. The cathode sheet provided in the present disclosure exhibits high energy density and long cycle life because of the cathode material with excellent electrochemical performance contained therein. Therefore, when the cathode sheet is applied to the sodium-ion battery, the sodium-ion battery correspondingly exhibits a high specific discharge capacity and long-cycle stability.

According to the present disclosure, by synchronously introducing the specific types and contents of anions and cations into the polyanionic phosphate active cathode material to achieve a good synergistic effect between the anions and cations, the particle morphology and size of the material are regulated while the intrinsic conductivity and structural stability of the cathode material are greatly improved, significant improvement of the comprehensive performance, such as specific capacity, rate capability, cycle stability and compaction density, of the material is promoted, and industrial application of the material is greatly promoted.

The description above is only an overview of the technical solutions of the present application. To make the technical means of the present application understood more clearly, implementation can be carried out in accordance with the contents of the specification. Moreover, to make the above and other objectives, features and advantages of the present application understood more obviously and easily, specific embodiments of the present application are particularly listed below.

BRIEF DESCRIPTION OF THE DRAWINGS

To illustrate the technical solutions of the present application more clearly, drawings required to be used in the present application are briefly introduced below. Obviously, the drawings described below are merely some embodiments of the present application, and for those of ordinary skill in the art, other drawings can also be obtained without exerting creative efforts according to these drawings.

DETAILED DESCRIPTION OF THE EMBODIMENTS

Figure 1:
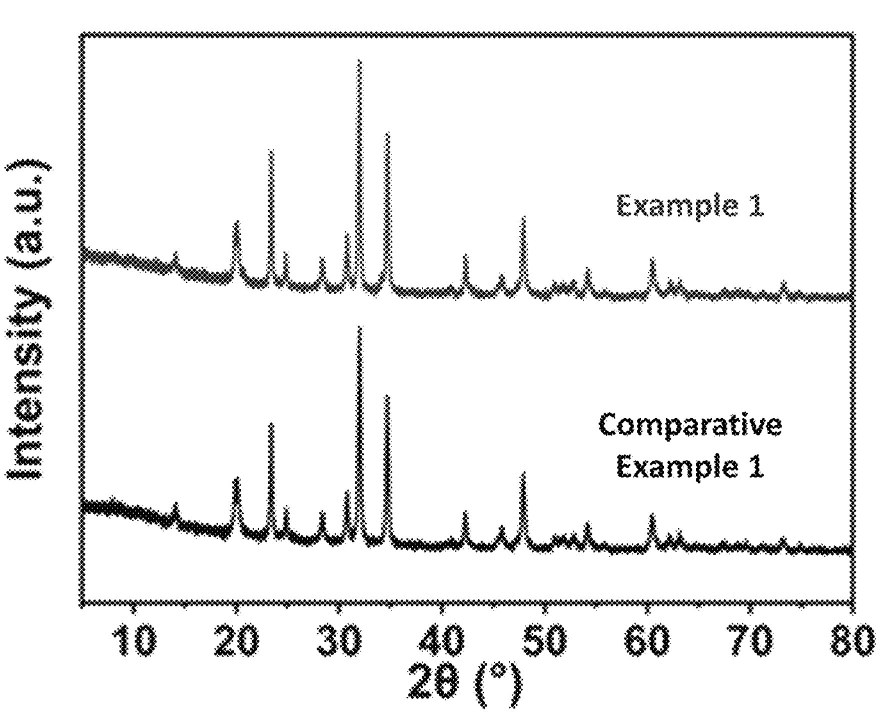
FIG. 1 shows an XRD diagram of cathode materials obtained in Example 1 and Comparative Example 1.

The embodiments of the technical solutions of the present application are described in detail below in combination with the drawings. The following embodiments are merely used for illustrating the technical solutions of the present application more clearly, and thus can only be used as examples and cannot be used to limit the scope of protection of the present application.

Unless otherwise defined, all technical terms and scientific terms used herein have same meanings as those generally understood by persons skilled in the technical field to which the present application belongs. The terms used herein are used only for the purpose of describing specific embodiments and are not intended to limit the present application. The terms "comprise" and "have" as well as any variations thereof in the illustration of the specification and claims of the present application as well as the aforementioned drawings are intended to cover non-exclusive inclusions.

In the description of the embodiments of the present application, the technical terms, such as "first", "second", etc., are used merely for distinguishing different objects and shall not be construed as indicating or implying relative importance or implicitly indicating a quantity, a specific order or a primary or secondary relationship of indicated technical features. In the description of the embodiments of the present application, "a plurality of" means two or more, unless clearly and specifically defined otherwise.

Reference to the "embodiments" herein means that particular features, structures or characteristics described in conjunction with the embodiments may be included in at least one embodiment of the present application. The phrase referred at various positions of the specification neither necessarily indicates same embodiments, nor indicates separate or alternative embodiments that are mutually exclusive with other embodiments. As understood explicitly and implicitly by those skilled in the art, the embodiments described herein may be combined with other embodiments.

In the description of the embodiments of the present application, the term "and/or" merely shows an association relationship describing associated objects, indicating that three kinds of relationships may exist. For example, A and/or B may be expressed in three situations, including separate presence of A, simultaneous presence of A and B, and separate presence of B. In addition, the character "/" herein generally means that former and latter associated objects have an "or" relationship.

As described in the background, polyanionic phosphate active cathode materials in the prior art have the problem of poor electrochemical performance. To solve the above technical problem, a first aspect of the present disclosure provides a cathode material. The cathode material includes a composite particle, a molecular formula of the composite particle is $Na_4M_xMn_{1-x/2}V(PO_4)_{3-x/3}N_x$, wherein $0.001 \leq x \leq 0.05$, M is Li and/or K, and N is selected from one or more of F, Cl, Br, and I.

In the present disclosure, the cathode material with particularly excellent electrochemical performance is obtained by co-doping of anions and cations. Wherein, the introduction of anions and cations can regulate an electronic structure of the cathode material and effectively increase active sites of the cathode material, thereby increasing the specific capacity of the cathode material. Specifically, compared with other types of anions and cations in the art, the halogen anions, such as F, Cl, Br, and I, and the alkali metal cations, such as Li and/or K, provided in the present disclosure can greatly improve the structural stability of a polyanionic phosphate material and the diffusion ability of $Na^+$ therein, such that the cathode material achieves excellent cycle stability and rate capability. Meanwhile, the micro-morphology and size of the particle of the cathode material can also be regulated through the co-doping of anions and cations, thereby greatly increasing the compaction density of the material and achieving higher energy density in practical application.

Wherein, the halogen anions have higher electronegativity than common acid radical ions in the art, such as sulfate radicals, phosphate radicals, carbonate radicals, etc., and can form stronger bonding with original transition metal ions, such as Mn and V, in the cathode material, thereby significantly improving the structural stability and electrochemical performance of the cathode material. The alkali metal cations, such as Li and/or K, have a more suitable ionic radius to be more easily embedded into and disembedded out of a polyanionic phosphate structure than other common cations in the art, such as $Ca^{2+}$, $Mg^{2+}$, etc., thereby improving the charge performance and discharge performance of a secondary battery prepared from the cathode material. Meanwhile, the aforementioned ions also exhibit higher electrical conductivity to further optimize the electrochemical performance of the cathode material.

Based on the above types of anions and cations, doping amounts of the anions and cations are optimized, that is, a stoichiometric number in the cathode material is uniform and is that $0.001 \le x \le 0.05$, such that the electronic structure can be more effectively regulated, $Na^+$ ion migration can be enhanced, and novel active sites can be formed, so as to make the cathode material exhibit higher electrochemical performance.

In particular, in addition to the selection of the types and doping amounts of the aforementioned anions and cations themselves, a coordination relationship between the two types of doping elements and a polyanionic phosphate cathode material matrix is more important. The polyanionic phosphate cathode material matrix itself has a relatively high theoretical specific capacity and good cycle stability, and the electrochemical performance can be further improved when the aforementioned anions and cations are introduced simultaneously at specific doping amounts. Compared with other types of cathode active materials, such as olivine type phosphates, the polyanionic phosphate matrix related in the present disclosure has better compatibility and coordination with the aforementioned anions and cations, and a cathode material with better electrochemical performance can be obtained ultimately. Therefore, the doping of anions and cations can enhance the structural stability, improve the electrical conductivity and promote the ion migration, thereby improving the electrochemical performance of the cathode material. Due to such synergistic effect, the polyanionic phosphate cathode material has more significant advantages in performance.

In some embodiments, in the molecular formula of the composite particle, $0.001 \le x \le 0.01$, M is Li and/or K, and N is selected from one or more of F, Br, and I.

In the present embodiment, in the molecular formula of the composite particle, $0.001 \le x \le 0.01$, thereby better avoiding the increase of the internal resistance of the cathode material and the decrease of the cycle stability caused by structural destruction of the cathode material. Meanwhile, M is preferably Li and/or K, and N is selected from one or more of F, Br, and I.

In some embodiments, the molecular formula of the composite particle is preferably $Na_4M_{0.01}Mn_{0.995}V(PO_4)_{2.997}N_{0.01}$, wherein M is Li and/or K, and N is selected from one or more of F, Br, and I; alternatively, the molecular formula of the composite particle is $Na_4M_{0.001}Mn_{0.9995}V(PO_4)_{2.9997}N_{0.001}$, wherein M is Li and/or K, and N is F. Under the above optimized molecular structure, the doping anions and cations can better synergistically cooperate with each other, such that the cathode material with more superior electrochemical performance can be obtained.

In some embodiments, considering changes in the molecular structure and electronic structure of the phosphate cathode material caused by the doping of anions and cations, the molecular formula of the composite particle is preferably $Na_4K_{0.01}Mn_{0.995}V(PO_4)_{2.997}F_{0.01}$, $Na_4Li_{0.01}Mn_{0.995}V(PO_4)_{2.997}F_{0.01}$, $Na_4K_{0.01}Mn_{0.995}V(PO_4)_{2.997}Br_{0.01}$, $Na_4K_{0.01}Mn_{0.995}V(PO_4)_{2.997}I_{0.01}$, $Na_4K_{0.001}Mn_{0.9995}V(PO_4)_{2.9997}F_{0.001}$, or $Na_4K_{0.05}Mn_{0.975}V(PO_4)_{2.983}F_{0.05}$, thereby obtaining the cathode material with better electrochemical performance and better stability.

Moreover, to further improve the stability and electrical conductivity of the cathode material, preferably, the cathode material further includes a carbon coating layer coated on outer surface of the composite particle, and calculated with a total weight of the cathode material as 100%, a mass fraction of the carbon coating layer is 1%-5%. More preferably, calculated with the total weight of the cathode material as 100%, the mass fraction of the carbon coating layer is 2.0%-2.5%.

A second aspect of the present disclosure provides a method for preparing a cathode material. The method for preparing a cathode material includes: preparing a sodium source, a doping element source, a manganese source, a vanadium source and a phosphorus source into a mixed slurry; and sequentially subjecting the mixed slurry to drying and calcination to obtain a cathode material; wherein the cathode material includes a composite particle, a molecular formula of the composite particle is $Na_4M_xMn_{1-x/2}V(PO_4)_{3-x/3}N_x$, $0.001 \le x \le 0.05$, M is Li and/or K, and N is selected from one or more of F, Cl, Br, and I.

For the aforementioned cathode material, the present disclosure correspondingly provides the preparation method. The preparation method is simple to operate, easy to control, and can optimize a reaction process to a greater extent to prepare the cathode material with excellent electrochemical performance at a lower manufacturing cost.

Further, to introduce a more uniform carbon layer on a surface of the cathode material to improve the electrical conductivity, the step of preparing the mixed slurry includes: preparing the carbon source into a carbon source solution with a concentration of 0.18 mol/L-0.20 mol/L, adding the sodium source, the doping element source, the manganese source, the vanadium source and the phosphorus source into the carbon source solution, and carrying out stirring to obtain the mixed slurry. Meanwhile, preferably, the carbon source is selected from one or more of glucose, citric acid monohydrate, and soluble starch.

In some embodiments, the calcination sequentially includes: first-stage calcination with a temperature being 320° C.-370° C. and a temperature-holding time for the first-stage calcination being 3 h-5 h; and second-stage calcination with a temperature being 700° C.-750° C. and a temperature-holding time for the second-stage calcination being 7 h-9 h. In the present disclosure, the calcination treatment is refined into two-stage calcination, thereby better facilitating the doping of anions and cations, better inhibiting the structural deterioration of the polyanionic phosphate cathode material itself and enhancing the structural stability and the electrochemical performance.

Wherein, to better protect the structure of the cathode material and reduce the introduction and generation of impurities, the first-stage calcination and the second-stage calcination are both carried out under the protection of an inert gas, and more preferably, the inert gas is argon and/or nitrogen. Thus, the cathode material with higher electrochemical performance and better stability is obtained, and a sodium-ion battery finally prepared therefrom has a higher specific capacity and higher long-cycle stability.

Further, to remove water more rapidly and evenly to reduce material aggregation and optimize the microstructure and density of the cathode material, the drying is spray drying, and the spray drying is carried out at an air inlet temperature of 200° C.-250° C. and an air outlet temperature of 100° C.-140° C.

In some embodiments, the doping element source is selected from one or more of potassium fluoride, lithium fluoride, potassium bromide, and potassium iodide. The aforementioned doping element source can more significantly optimize the molecular structure and electronic structure of the cathode material without introducing other impurity elements, thereby facilitating the improvement of the electrochemical performance and structural stability of the cathode material more effectively.

Further, the sodium source is selected from one or more of sodium acetate, sodium carbonate, sodium hydroxide, and sodium nitrate; and/or, the phosphorus source is selected from one or more of ammonium dihydrogen phosphate, ammonium monohydrogen phosphate, ammonium phosphate, and phosphoric acid. The selection of the sodium source and the phosphorus source has an important impact on the synthesis process and final performance of the cathode material. In the present disclosure, by adjusting the types of the two as above, synthesis conditions of the cathode material can be optimized, and the consistency and stability of the material can be improved.

Further, the manganese source is selected from one or more of manganese acetate tetrahydrate, manganese nitrate, manganese phosphate, and manganese oxalate; and/or, the vanadium source is selected from one or more of ammonium metavanadate, ammonium vanadate, and ammonium sulfate. The selection of the manganese source and the vanadium source can affect the electronic structure and ion diffusion path of the cathode material. By optimizing the two respectively as above, the electronic conductivity and ion diffusion efficiency of the cathode material can be further improved.

A third aspect of the present disclosure provides a cathode sheet. The cathode sheet includes the aforementioned cathode material or a cathode material prepared by the aforementioned method for preparing a cathode material.

The cathode material provided in the present disclosure has excellent electrochemical performance and stability. Therefore, when the cathode material is used as an active material of the cathode sheet, the corresponding cathode sheet also has high energy density, long cycle life and excellent electrochemical stability, thereby significantly improving the overall performance of a battery.

A fourth aspect of the present disclosure provides a sodium-ion battery, which includes the aforementioned cathode sheet.

The cathode sheet provided in the present disclosure exhibits high energy density and long cycle life because of the cathode material with excellent electrochemical performance contained therein. Therefore, when the cathode sheet is applied to the sodium-ion battery, the sodium-ion battery correspondingly exhibits a high specific discharge capacity and long-cycle stability.

The present application is further described in detail below in conjunction with specific embodiments, and these embodiments shall not be construed as limiting the scope of protection as claimed by the present application.

Unless otherwise defined, all the technical terms used herein have the same meanings as commonly understood by those skilled in the art. The technical terms used herein are only for the purpose of describing specific embodiments, and are not intended to limit the scope of protection of the present disclosure.

Some specific embodiments are listed below. It should be noted that the embodiments described below are exemplary, which are intended only to explain the present application and shall not be understood as limitations of the present application. Products without specific technologies or conditions in the embodiments are used according to technologies or conditions as described in documents in the art or manuals of the products. Reagents or instruments used without specific manufacturers are conventional products available on the market.

1. Preparation Method

Example 1

A method for preparing a cathode material was provided:

Citric acid monohydrate ($C_6H_6O_7 \cdot H_2O$) was weighed, added into deionized water and stirred to prepare a transparent solution with a $C_6H_8O_7 \cdot H_2O$ concentration of 0.18 mol/L.

Sodium acetate ($CH_3COONa$) as a sodium source, potassium fluoride (KF) as a doping element source, manganese acetate tetrahydrate [$(CH_3COO)_2Mn \cdot 4H_2O$] as a manganese source, ammonium metavanadate ($NH_4VO_3$) as a vanadium source and ammonium dihydrogen phosphate ($NH_4H_2PO_4$) as a phosphorus source were weighed at a molar ratio of 4:0.001:0.9995:1:2.9997 and sequentially added into the above solution. Then, the solution was continuously stirred thoroughly to obtain a mixed slurry.

The mixed slurry was subjected to spray drying and granulation to obtain a brownish-yellow precursor material, wherein during the spray drying process, an air inlet temperature was 220° C., and an air outlet temperature was 120° C. The brownish-yellow precursor material was placed in a sintering furnace under argon atmosphere, heated to 350° C. at a heating rate of 5° C./min and kept at this temperature for 4 h, i.e. the first-stage calcination. It is then heated to 720° C. at a heating rate of 5° C. $min^{-1}$ and kept at this temperature for 8 h, i.e. the second-stage calcination, so as to complete calcination.

After the calcination, a black powder, that is, a carbon-coated $K^+$ and $F^-$ co-doped $Na_4MnV(PO_4)_3$ material was obtained, with a molecular formula of $Na_4K_{0.001}Mn_{0.9995}V$ $(PO_4)_{2.9997}F_{0.001}$. Meanwhile, calculated with a total weight of the black powder as 100%, a mass fraction of a carbon coating layer was 2.4%.

Figure 2:
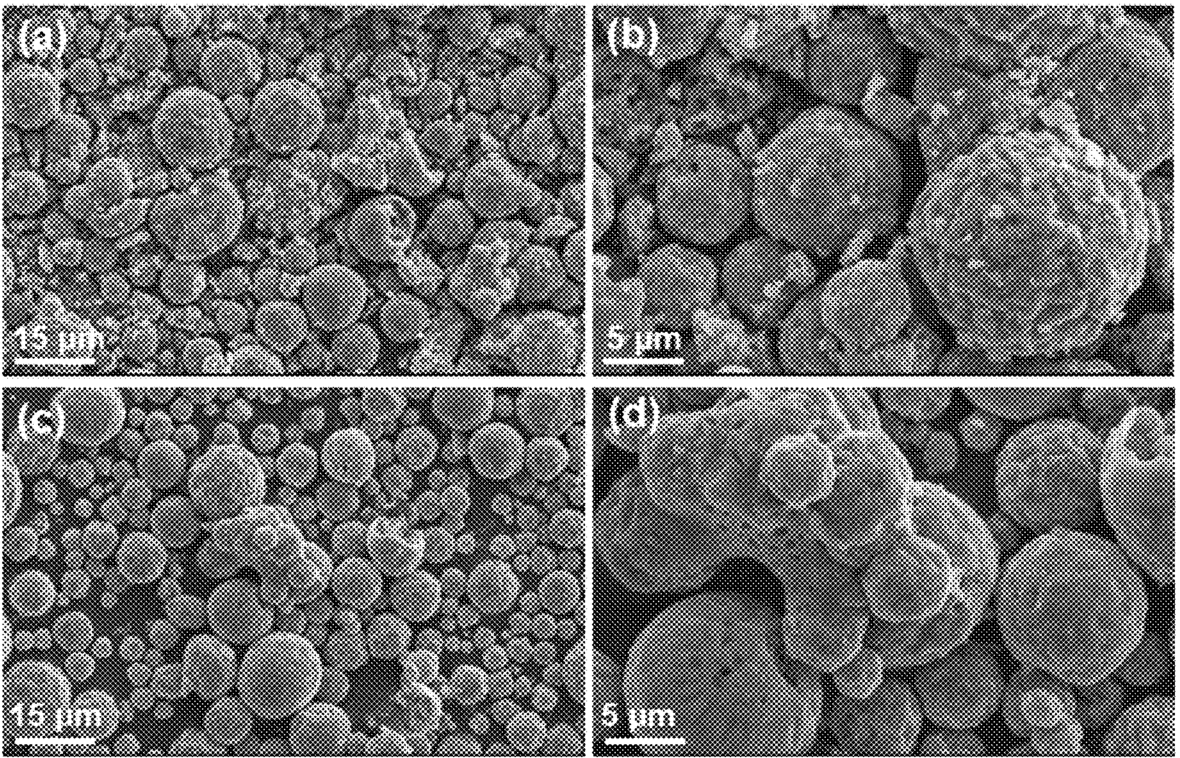
FIG. 2 shows SEM characterization results of the cathode materials obtained in Example 1 and Comparative Example 1, wherein FIG. 2(*a*) and FIG. 2(*b*) show the SEM characterization results of the cathode material obtained in Example 1, FIG. 2(*c*) and FIG. 2(*d*) show the SEM characterization results of the cathode material obtained in Comparative Example 1.

An XRD diagram of the obtained cathode material is shown in FIG. 1, and SEM characterization results are shown in FIG. 2(*a*) and FIG. 2(*b*), wherein a scale in FIG. 2(*a*) is 15 μm, and a scale in FIG. 2(*b*) is 5 μm.

As can be seen from FIG. 1, a crystal form of the cathode material doped with K and F ions obtained in Example 1 still remains consistent with that of undoped $Na_4MnV(PO_4)_3$. That is to say, the crystal form of the obtained cathode material is not destroyed and is still a polyanionic phosphate structure after the co-doping of $K^+$ and $F^-$, and corresponding structural advantages are also retained, thereby exhibiting more superior electrochemical performance on such basis.

Example 2

A method for preparing a cathode material was provided:

The difference between the present example and Example 1 is that the molar ratio of the sodium acetate ($CH_3COONa$) as the sodium source, the potassium fluoride (KF) as the doping element source, the manganese acetate tetrahydrate $[(CH_3COO)_2Mn\cdot 4H_2O]$ as the manganese source, the ammonium metavanadate ($NH_4VO_3$) as the vanadium source and the ammonium dihydrogen phosphate ($NH_4H_2PO_4$) as the phosphorus source was changed into 4:0.01:0.995:1:2.997.

A black powder, that is, a carbon-coated $K^+$ and $F^-$ co-doped $Na_4MnV(PO_4)_3$ material was obtained, with a molecular formula of $Na_4K_{0.01}Mn_{0.995}V(PO_4)_{2.997}F_{0.01}$.

Example 3

A method for preparing a cathode material was provided:

The difference between the present example and Example 1 is that the molar ratio of the sodium acetate ($CH_3COONa$) as the sodium source, the potassium fluoride (KF) as the doping element source, the manganese acetate tetrahydrate $[(CH_3COO)_2Mn\cdot 4H_2O]$ as the manganese source, the ammonium metavanadate ($NH_4VO_3$) as the vanadium source and the ammonium dihydrogen phosphate ($NH_4H_2PO_4$) as the phosphorus source was changed into 4:0.05:0.975:1:2.983.

A black powder, that is, a carbon-coated $K^+$ and $F^-$ co-doped $Na_4MnV(PO_4)_3$ material was obtained, with a molecular formula of $Na_4K_{0.05}Mn_{0.975}V(PO_4)_{0.983}F_{0.05}$.

Example 4

A method for preparing a cathode material was provided:

The difference between the present example and Example 2 is that an equal molar amount of lithium fluoride (LiF) was used to replace the potassium fluoride (KF) to obtain a carbon-coated $Li^+$ and $F^-$ co-doped $Na_4MnV(PO_4)_3$ material, with a molecular formula of $Na_4Li_{0.01}Mn_{0.995}V(PO_4)_{2.997}F_{0.01}$.

Example 5

A method for preparing a cathode material was provided:

The difference between the present example and Example 2 is that an equal molar amount of potassium bromide (KBr) was used to replace the potassium fluoride (KF) to obtain a carbon-coated $K^+$ and $Br^-$ co-doped $Na_4MnV(PO_4)_3$ material, with a molecular formula of $Na_4K_{0.01}Mn_{0.995}V(PO_4)_{2.997}Br_{0.01}$.

Example 6

A method for preparing a cathode material was provided:

The difference between the present example and Example 2 is that an equal molar amount of potassium iodine (KI) was used to replace the potassium fluoride (KF) to obtain a carbon-coated $K^+$ and $I^-$ co-doped $Na_4MnV(PO_4)_3$ material, with a molecular formula of $Na_4K_{0.01}Mn_{0.995}V(PO_4)_{2.997}I_{0.01}$.

Example 7

A method for preparing a cathode material was provided:

The differences between the present example and Example 1 are that during the spray drying process, the air inlet temperature was changed into 280° C., and the air outlet temperature was changed into 80° C.

Example 8

A method for preparing a cathode material was provided:

The differences between the present example and Example 1 are that during the spray drying process, the air inlet temperature was changed into 180° C., and the air outlet temperature was changed into 160° C.

Example 9

A method for preparing a cathode material was provided:

The differences between the present example and Example 1 are that the temperature of the first-stage calcination was changed into 320° C., and the temperature-holding time for the first-stage calcination was changed into 5 h; and the temperature of the second-stage calcination was changed into 700° C., and the temperature-holding time for the second-stage calcination was changed into 9 h.

Example 10

A method for preparing a cathode material was provided:

The differences between the present example and Example 1 are that the temperature of the first-stage calcination was changed into 370° C., and the temperature-holding time for the first-stage calcination was changed into 3 h; and the temperature of the second-stage calcination was changed into 750° C., and the temperature-holding time for the second-stage calcination was changed into 7 h.

Example 11

A method for preparing a cathode material was provided:

The differences between the present example and Example 1 are that the temperature of the first-stage calcination was changed into 300° C., and the temperature-holding time for the first-stage calcination was changed into 6 h; and the temperature of the second-stage calcination was changed into 780° C., and the temperature-holding time for the second-stage calcination was changed into 6 h.

Example 12

A method for preparing a cathode material was provided:

The differences between the present example and Example 1 are that the temperature of the first-stage calcination was changed into 400° C., and the temperature-holding time for the first-stage calcination was changed into 2 h; and the temperature of the second-stage calcination was changed into 680° C., and the temperature-holding time for the second-stage calcination was changed into 10 h.

Example 13

A method for preparing a cathode material was provided:

The differences between the present example and Example 1 are that the second-stage calcination was not carried out, and the sintering furnace for the calcination was not protected under the argon atmosphere.

Comparative Example 1

A method for preparing a cathode material was provided:

The differences between the present comparative example and Example 1 are that the KF as the doping element source was not added, and the molar ratio of the sodium acetate ($CH_3COONa$) as the sodium source, the manganese acetate tetrahydrate [$(CH_3COO)_2Mn \cdot 4H_2O$] as the manganese source, the ammonium metavanadate ($NH_4VO_3$) as the vanadium source and the ammonium dihydrogen phosphate ($NH_4H_2PO_4$) as the phosphorus source was changed into 4:1:1:3.

A black powder, that is, a carbon-coated undoped $Na_4MnV(PO_4)_3$ material was obtained.

An XRD diagram of the obtained cathode material is shown in FIG. 1, and SEM characterization results are shown in FIG. 2(*c*) and FIG. 2(*d*), wherein a scale in FIG. 2(*c*) is 15 μm, and a scale in FIG. 2(*d*) is 5 μm.

Comparative Example 2

A method for preparing a cathode material was provided:

The difference between the present comparative example and Example 1 is that the molar ratio of the sodium acetate ($CH_3COONa$) as the sodium source, the potassium fluoride (KF) as the doping element source, the manganese acetate tetrahydrate [$(CH_3COO)_2Mn \cdot 4H_2O$] as the manganese source, the ammonium metavanadate ($NH_4VO_3$) as the vanadium source and the ammonium dihydrogen phosphate ($NH_4H_2PO_4$) as the phosphorus source was changed into 4:0.0005:0.99975:1:2.9998 to obtain a $K^+$ and $F^-$ co-doped $Na_4MnV(PO_4)_3$ material, with a molecular formula of $Na_4K_{0.0005}Mn_{0.99975}V(PO_4)_{2.9998}F_{0.0005}$.

Comparative Example 3

A method for preparing a cathode material was provided:

The difference between the present comparative example and Example 1 is that the molar ratio of the sodium acetate ($CH_3COONa$) as the sodium source, the potassium fluoride (KF) as the doping element source, the manganese acetate tetrahydrate [$(CH_3COO)_2Mn \cdot 4H_2O$] as the manganese source, the ammonium metavanadate ($NH_4VO_3$) as the vanadium source and the ammonium dihydrogen phosphate ($NH_4H_2PO_4$) as the phosphorus source was changed into 4:0.1:0.95:1:2.97 to obtain a $K^+$ and $F^-$ co-doped $Na_4MnV(PO_4)_3$ material, with a molecular formula of $Na_4K_{0.1}Mn_{0.95}V(PO_4)_{2.97}F_{0.1}$.

Comparative Example 4

A method for preparing a cathode material was provided:

The difference between the present comparative example and Example 1 is that an equal molar amount of potassium sulfate ($K_2(SO_4)$) was used to replace the potassium fluoride (KF) to obtain a carbon-coated $K^+$ and $SO_4^{2-}$ co-doped $Na_4MnV(PO_4)_3$ material, with a molecular formula of $Na_4K_{0.001}Mn_{0.9995}V(PO_4)_{2.9997}(SO_4)_{0.0005}$.

Comparative Example 5

A method for preparing a cathode material was provided:

The difference between the present comparative example and Example 1 is that an equal molar amount of calcium fluoride ($CaF_2$) was used to replace the potassium fluoride (KF) to obtain a carbon-coated $Ca^{2+}$ and $F^-$ co-doped $Na_4MnV(PO_4)_3$ material, with a molecular formula of $Na_4Ca_{0.001}Mn_{0.9995}V(PO_4)_{2.997}F_{0.002}$.

2. Test Methods

Compaction density: In accordance with GB/T 24533, the powder compaction density of the cathode materials obtained in various examples and comparative examples was determined.

Battery preparation and performance test: A cathode material, Super P (conductive additive) and a binder (PVDF+NMP) were ground and mixed at a mass ratio of 7:2:1 to obtain an evenly mixed slurry, and then the evenly mixed slurry was evenly coated on dry aluminum foil by a four-sided device (applicator). The coated slurry was placed in a vacuum oven for drying at 100° C. for 12 h, cooled to room temperature, and cut into a circular electrode sheet with a 12 mm mold. Then, the electrode sheet was weighed with an electronic balance to obtain a mass, each electrode sheet was weighed for three times to obtain a mean value and finally placed in a drying oven at 100° C. and stored for later use, and the process of assembling a battery was carried out in a glove box under argon atmosphere. The prepared electrode sheet was placed in a transition chamber of the glove box, subjected to vacuumizing and air supplementing for three times, and then brought into the glove box. A sodium block was partially cut, pressed flat and punched into a circular sodium sheet with a 12 mm mold. Then, a gasket and the sodium sheet were sequentially placed into a negative case and pressed flat. Then, a diaphragm was placed, an electrolyte was added dropwise, and the electrode sheet (one side of the cathode material was oriented toward the diaphragm). Finally, a gasket and a spring sheet were placed, respectively. A positive case was fastened, and a CR2032 button battery was assembled. Finally, the battery was closed and sealed on a battery sealing machine and subjected to standing at room temperature for about 6 h, and then an electrochemical test was carried out. The electrolyte was a mixture of 1 M $NaClO_4$, 95% PC and 5% FEC, and the diaphragm was a glass fiber. Battery samples corresponding to the cathode materials prepared in various examples and comparative examples were obtained, and the battery samples were subjected to a charge-discharge test under conditions of 25° C. and 2.5 V-3.8 V to obtain the specific discharge capacity at 0.1 C and 1 C, respectively. The cycle performance was tested by a Neware electrochemical test cabinet to obtain the specific capacity decrease rate at 1 C after 500 cycles.

The above test results are shown in Table 1.

TABLE 1

| | Material | Battery performance | | |
|---|---|---|---|---|
| | performance Compaction density (g/mL) | Specific discharge capacity at 0.1 C (mAh/g) | Specific discharge capacity at 1 C (mAh/g) | Specific capacity decrease rate after 500 cycles (%) |
| Example 1 | 1.935 | 103.98 | 102.42 | 12.12 |
| Example 2 | 1.943 | 104.99 | 102.38 | 12.45 |
| Example 3 | 1.938 | 100.55 | 91.44 | 24.40 |
| Example 4 | 1.928 | 103.22 | 101.10 | 13.41 |
| Example 5 | 1.932 | 102.68 | 100.58 | 12.33 |
| Example 6 | 1.934 | 103.15 | 100.69 | 11.55 |
| Example 7 | 1.939 | 102.13 | 101.43 | 13.66 |
| Example 8 | 1.930 | 101.91 | 101.33 | 14.71 |
| Example 9 | 1.936 | 105.30 | 104.90 | 11.45 |
| Example 10 | 1.927 | 104.80 | 104.60 | 12.47 |
| Example 11 | 1.934 | 102.10 | 101.22 | 15.30 |
| Example 12 | 1.927 | 102.40 | 102.10 | 15.28 |
| Example 13 | 1.940 | 98.55 | 92.30 | 23.90 |
| Comparative Example 1 | 1.929 | 103.67 | 86.76 | 26.89 |
| Comparative Example 2 | 1.935 | 103.27 | 102.89 | 25.30 |
| Comparative Example 3 | 1.943 | 102.98 | 102.66 | 26.28 |
| Comparative Example 4 | 1.938 | 104.83 | 104.45 | 27.45 |
| Comparative Example 5 | 1.926 | 102.78 | 101.82 | 25.47 |

3. Analysis of Test Results of Various Examples and Comparative Examples

As can be seen from the above results, the preparation of the cathode materials with better electrochemical performance is achieved in the above examples of the present disclosure. Specifically:

as can be seen by comparing various examples and comparative examples, for the molecular formula, $Na_4M_xMn_{1-x/2}V(PO_4)_{3-x/3}N_x$, of the composite particle provided in the present disclosure, when $0.001 \leq x \leq 0.05$, M is Li and/or K and N is selected from one or more of F, Cl, Br, and I, the obtained cathode materials have better electrochemical performance. When the materials are used as the cathode materials, the prepared batteries exhibit a higher specific capacity and better cycle stability.

As can be seen by comparing Example 3 with Example 1, Example 2, Example 4, Example 5 and Example 6, in addition to the selection of the types of anions and cations, the doping amounts corresponding to the types also have an impact on the performance of the obtained cathode materials. As can be seen from these examples, when the molecular formula of the composite particle is $Na_4M_{0.01}Mn_{0.995}V(PO_4)_{2.997}N_{0.01}$, wherein M is Li and/or K, and N is selected from one or more of F, Br, and I; alternatively, when the molecular formula of the composite particle is $Na_4M_{0.001}Mn_{0.9995}V(PO_4)_{2.9997}N_{0.001}$, wherein M is Li and/or K, and N is F, the obtained cathode materials exhibit more excellent electrochemical performance. When the molecular formula of the composite particle is $Na_4K_{0.01}Mn_{0.995}V(PO_4)_{2.997}F_{0.01}$, $Na_4Li_{0.01}Mn_{0.995}V(PO_4)_{2.997}F_{0.01}$, $Na_4K_{0.01}Mn_{0.995}V(PO_4)_{2.997}Br_{0.01}$, $Na_4K_{0.01}Mn_{0.995}V(PO_4)_{2.997}I_{0.01}$, $Na_4K_{0.001}Mn_{0.9995}V(PO_4)_{2.9997}F_{0.001}$, or $Na_4K_{0.05}Mn_{0.975}V(PO_4)_{2.983}F_{0.05}$, the corresponding battery samples have a higher specific capacity and higher cycle stability after the batteries are prepared from the obtained cathode materials.

As can be seen by comparing Example 7 and Example 8 with Example 1, when the drying is spray drying and the spray drying is carried out at the air inlet temperature of 200° C.-250° C. and the air outlet temperature of 100° C.-140° C., material agglomeration can be reduced, and the microstructure and density of the cathode materials can be optimized, such that the cathode materials exhibit higher electrochemical performance.

As can be seen by comparing Example 9 and Example 10 with Example 1, Example 11 and Example 12, the temperature of the first-stage calcination is preferably 320° C.-370° C., and the temperature-holding time for the first-stage calcination is preferably 3 h-5 h. Meanwhile, the temperature of the second-stage calcination is preferably 700° C.-750° C., and the temperature-holding time for the second-stage calcination is preferably 7 h-9 h, which is helpful to better achieving the doping of anions and cations. Above calcination temperature can also better inhibit the structural deterioration of the polyanionic phosphate cathode material itself while enhancing the structural stability and the electrochemical performance.

As can be seen by comparing Example 13 with Example 1, when the calcination treatment is refined into two-stage calcination and the first-stage calcination and the second-stage calcination are both carried out under the protection of an inert gas, the cathode material with higher electrochemical performance and better stability can be obtained, and the sodium-ion battery finally prepared therefrom has a higher specific capacity and higher long-cycle stability.

It should be noted that the present application is not limited to the above embodiments. The above embodiments are only examples, and embodiments that have essentially the same composition as the technical ideas and achieve the same effects within the scope of the technical solutions of the present application are included in the technical scope of the present application. In addition, without deviating from the scope of main purposes of the present application, other embodiments constructed by applying various variations that may be thought of by those skilled in the art to the embodiments or by combining some of constituent elements of the embodiments shall also be included in the scope of the present application.

What is claimed is:

1. A cathode material, wherein the cathode material comprises a composite particle, a molecular formula of the composite particle is $Na_4M_xMn_{1-x/2}V(PO_4)_{3-x/3}N_x$, wherein $0.001 \le x \le 0.05$, M is Li and/or K, and N is selected from one or more of F, Cl, Br, and I.

2. The cathode material according to claim 1, wherein in the molecular formula of the composite particle, $0.001 \le x \le 0.01$, M is Li and/or K, and N is selected from one or more of F, Br, and I.

3. The cathode material according to claim 2, wherein, the molecular formula of the composite particle is $Na_4M_{0.01}Mn_{0.995}V(PO_4)_{2.997}N_{0.01}$, wherein M is Li and/or K, and N is selected from one or more of F, Br, and I.

4. The cathode material according to claim 3, wherein the molecular formula of the composite particle is $Na_4K_{0.01}Mn_{0.995}V(PO_4)_{2.997}F_{0.01}$, $Na_4Li_{0.01}Mn_{0.995}V(PO_4)_{2.997}F_{0.01}$, $Na_4K_{0.01}Mn_{0.995}V(PO_4)_{2.997}Br_{0.01}$, $Na_4K_{0.01}Mn_{0.995}V(PO_4)_{2.997}I_{0.01}$, $Na_4K_{0.001}Mn_{0.9995}V(PO_4)_{2.9997}F_{0.001}$, or $Na_4K_{0.05}Mn_{0.975}V(PO_4)_{2.983}F_{0.05}$.

5. The cathode material according to claim 2, wherein, the molecular formula of the composite particle is $Na_4M_{0.001}Mn_{0.9995}V(PO_4)_{2.9997}N_{0.001}$, wherein M is Li and/or K, and N is F.

6. The cathode material according to claim 1, wherein the cathode material further includes a carbon coating layer coated on outer surface of the composite particle, and calculated with a total weight of the cathode material as 100%, a mass fraction of the carbon coating layer is 1%-5%.

7. The cathode material according to claim 6, wherein calculated with the total weight of the cathode material as 100%, the mass fraction of the carbon coating layer is 2.0%-2.5%.

8. A cathode sheet, wherein the cathode sheet comprises the cathode material according to claim 1.

9. A sodium-ion battery, wherein the sodium-ion battery comprises the cathode sheet according to claim 8.

10. A method for preparing a cathode material, comprising:

preparing a sodium source, a doping element source, a manganese source, a vanadium source and a phosphorus source into a mixed slurry; and sequentially subjecting the mixed slurry to drying and calcination to obtain a cathode material;

wherein the cathode material comprises a composite particle, a molecular formula of the composite particle is $Na_4M_xMn_{1-x/2}V(PO_4)_{3-x/3}N_x$, wherein $0.001 \le x \le 0.05$, M is Li and/or K, and N is selected from one or more of F, Cl, Br, and I.

11. The method for preparing a cathode material according to claim 10, wherein the calcination sequentially comprises:

first-stage calcination with a temperature being 320° C.-370° C. and a temperature-holding time for the first-stage calcination being 3 h-5 h; and second-stage calcination with a temperature being 700° C.-750° C. and a temperature-holding time for the second-stage calcination being 7 h-9 h.

12. The method for preparing a cathode material according to claim 11, wherein the drying is spray drying, and the spray drying is carried out at an air inlet temperature of 200° C.-250° C. and an air outlet temperature of 100° C.-140° C.

13. The method for preparing a cathode material according to claim 12, wherein the doping element source is selected from one or more of potassium fluoride, lithium fluoride, potassium bromide, and potassium iodide.

14. The method for preparing a cathode material according to claim 11, wherein the first-stage calcination and the second-stage calcination are both carried out under the protection of an inert gas.

15. The method for preparing a cathode material according to claim 10, wherein the sodium source is selected from one or more of sodium acetate, sodium carbonate, sodium hydroxide, and sodium nitrate.

16. The method for preparing a cathode material according to claim 10, wherein the manganese source is selected from one or more of manganese acetate tetrahydrate, manganese nitrate, manganese phosphate, and manganese oxalate.

17. The method for preparing a cathode material according to claim 10, wherein the vanadium source is selected from one or more of ammonium metavanadate, ammonium vanadate, and ammonium sulfate.

18. The method for preparing a cathode material according to claim 10, wherein the phosphorus source is selected from one or more of ammonium dihydrogen phosphate, ammonium monohydrogen phosphate, ammonium phosphate, and phosphoric acid.

19. The method for preparing a cathode material according to claim 10, wherein the step of preparing the mixed slurry includes: preparing a carbon source into a carbon source solution with a concentration of 0.18 mol/L-0.20 mol/L, adding the sodium source, the doping element source, the manganese source, the vanadium source and the phosphorus source into the carbon source solution, and carrying out stirring to obtain the mixed slurry.

20. The method for preparing a cathode material according to claim 19, wherein the carbon source is selected from one or more of glucose, citric acid monohydrate, and soluble starch.

* * * * *